United States Patent
Strickel

[11] Patent Number: 5,881,637
[45] Date of Patent: Mar. 16, 1999

[54] CHAFING DISH SKIRT

[76] Inventor: David L. Strickel, 5121 Norma St., Fort Worth, Tex. 76112

[21] Appl. No.: 936,619

[22] Filed: Sep. 24, 1997

Related U.S. Application Data

[60] Provisional application No. 60/026,790 Sep. 27, 1996.
[51] Int. Cl.⁶ .................................................. A47J 27/00
[52] U.S. Cl. ................................ 99/449; 99/337; 126/9 R; 220/694; D7/355; D7/366
[58] Field of Search ............................ 99/449, 340, 422, 99/337, 338; 126/9 R, 9 A, 9 B; 252/608, 609; 8/115.51, 115.6; 220/694, 912; D7/355, 366

[56] References Cited

U.S. PATENT DOCUMENTS

| | | |
|---|---|---|
| D. 229,733 | 1/1974 | Press . |
| 2,159,425 | 11/1939 | Davies . |
| 3,818,970 | 6/1974 | Schmitz et al. . |
| 4,838,447 | 6/1989 | Ali ............................................ 220/694 |
| 5,205,003 | 4/1993 | Green ........................................... 5/493 |
| 5,335,383 | 8/1994 | Schwind ....................................... 5/493 |
| 5,711,210 | 1/1998 | Kaufman ................................. 99/449 X |

Primary Examiner—Reginald L. Alexander
Attorney, Agent, or Firm—Richard C. Littman

[57] ABSTRACT

A chafing dish skirt made of fabric having fire-retardant qualities and a method of making a particular fabric fire retardant. The chafing dish skirt is sized and configured to shield the heating device for the chafing dish while permitting air circulation to the heating device if such device is an open-flame type device. The chafing dish skirt is weighted to counter the effects of wind. The device is flexible, easily washable, and economical to produce. The skirt device helps retain heat within the chafing dish. The fire-retardant chafing dish skirt is attached to the chafing dish or the chafing dish frame.

11 Claims, 2 Drawing Sheets

CHAFING DISH SKIRT

CROSS REFERENCE TO RELATED APPLICATIONS

This application claims the benefit of U.S. Provisional application Ser. No. 60/026,790 filed Sep. 27, 1996.

BACKGROUND OF THE INVENTION

1. Field of the Invention

The present invention relates to a shield for a chafing dish burner, and more particularly to a flexible, easily washable, and economical chafing dish skirt, that will prevent wind from affecting the heat source of the chafing dish, and help retain heat around the chafing dish. The chafing dish skirt is made of fire retardant material, and is attached to the chafing dish or the chafing dish frame. The skirt is weighted to help counteract the effects of wind.

2. Description of the Related Art

Prior art chafing dish burner wind shields are generally solid shields. Such shields can effectively shield open flame heat sources for the chafing dish from the wind. However, such shields are heavy, expensive to manufacture, difficult to store, and clean.

Accordingly, there is a need for a chafing dish burner wind shield that is lightweight, compact and/or compressible for easy storage, inexpensive to manufacture, and easy to clean.

U.S. Pat. No. 4,838,446 issued to Ali on Jun. 13, 1989 describes a wind shield for a chafing dish burner. The device may include one or two L-shaped walled structures to deflect wind that may blow out the open flame of the burner. This device is not lightweight, it is not compact nor compressible for easy storage, it is not easy to manufacture and it is not easy to clean.

U.S. Pat. No. 3,818,970 issued to Schmitz et al. on Jun. 25, 1974 describes a weighing band for curtains, drapes and the like. Similar devices may be used to weigh down the lower sections of the present invention to help counter the forces of wind.

U.S. Pat. No. 5,335,383 issued to Schwind on Aug. 9, 1994 describes a "removably attachable flat sheet-skirting combination." The device teaches the attachment of a pleated sheeting around the bed springs of a conventional bed. The sheeting is not weighted and the device is not made to be fire retardant.

None of the above noted inventions and patents, taken either singly or in combination, is seen to describe the instant invention as claimed.

SUMMARY OF THE INVENTION

A chafing dish skirt made of fabric with fire-retardant qualities is disclosed. A method of making a particular fabric fire retardant is also disclosed. The chafing dish skirt is sized and configured to shield the heating devices for the chafing dish while permitting air circulation to the heating device if such device is an open-flame type device. The chafing dish skirt is weighted to counter the movement of the skirt that maybe caused by wind. The chafing dish skirt is flexible, easily washable, and economical to produce. The skirt device helps retain heat within the chafing dish to save energy. The chafing dish skirt is fire retardant and it is securely attached to the chafing dish or the chafing dish frame.

Accordingly, it is a principal object of the present invention to provide a chafing dish skirt which effectively shields the chafing dish burner(s) or heat source from the wind.

Another of the objects of the present invention is to provide a chafing dish skirt that effectively helps reflect some of the heat generated by the chafing dish burner toward the chafing dish.

Yet another of the objects of the present invention is to provide a chafing dish skirt that is fire-retardant.

Still another of the objects of the present invention is to provide a chafing dish skirt that is weighted to keep most wind from away from the chafing dish heat source.

A further object of the present invention is to provide a chafing dish skirt that is lightweight.

An additional object of the present invention is to provide a chafing dish skirt that is made primarily of fabric so that it can be easily washed and stored.

A final object of the present invention is to provide a chafing dish skirt that is economical to produce.

These and other objects of the present invention will be more readily apparent as the nature of the invention is hereinafter more fully described, illustrated and claimed with reference being made to the attached drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The preferred embodiment of a skirt for shielding wind away from the heat source of a chafing dish and for reflecting some of the heat generated by the heat source to the chafing dish is disclosed. The skirt is made of fabric having fire-retardant qualities. A method of fire-retarding a particular fabric that is used to make the skirt is also disclosed. The chafing dish skirt is sized and configured to shield the heating devices for the chafing dish while permitting air circulation to the heating device if such device is an open-flame type device. The chafing dish skirt is weighted to counter the movement of the skirt that maybe caused by wind. The device is flexible, easily washable, and economical to produce. The chafing dish skirt is attached to the chafing dish or the chafing dish frame.

Figure 1:
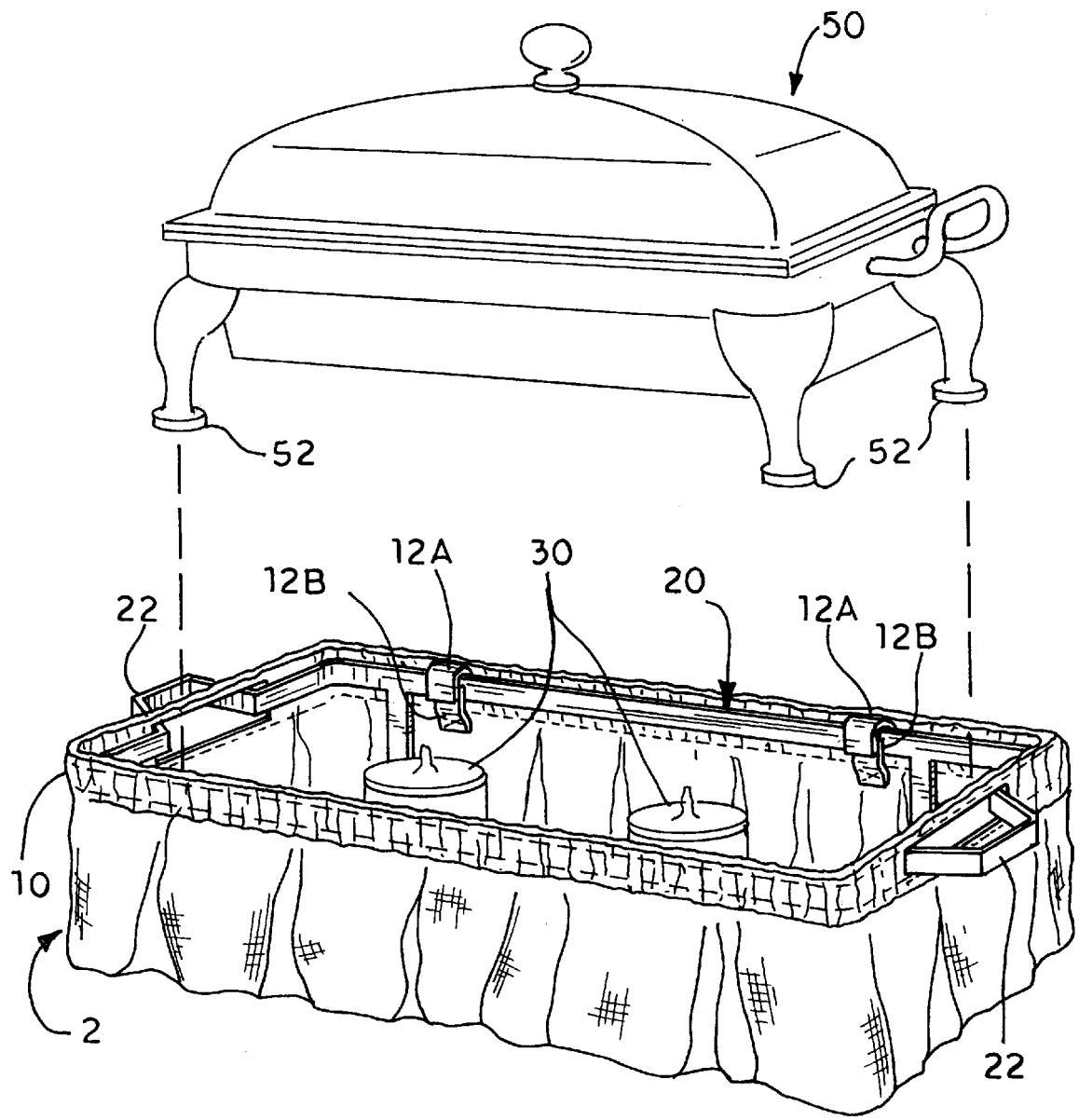
FIG. 1 is a perspective view of the chafing dish skirt that is removably attached to a chafing dish frame and the chafing dish is shown suspended above the chafing dish frame with the skirt attached.
Figure 2:
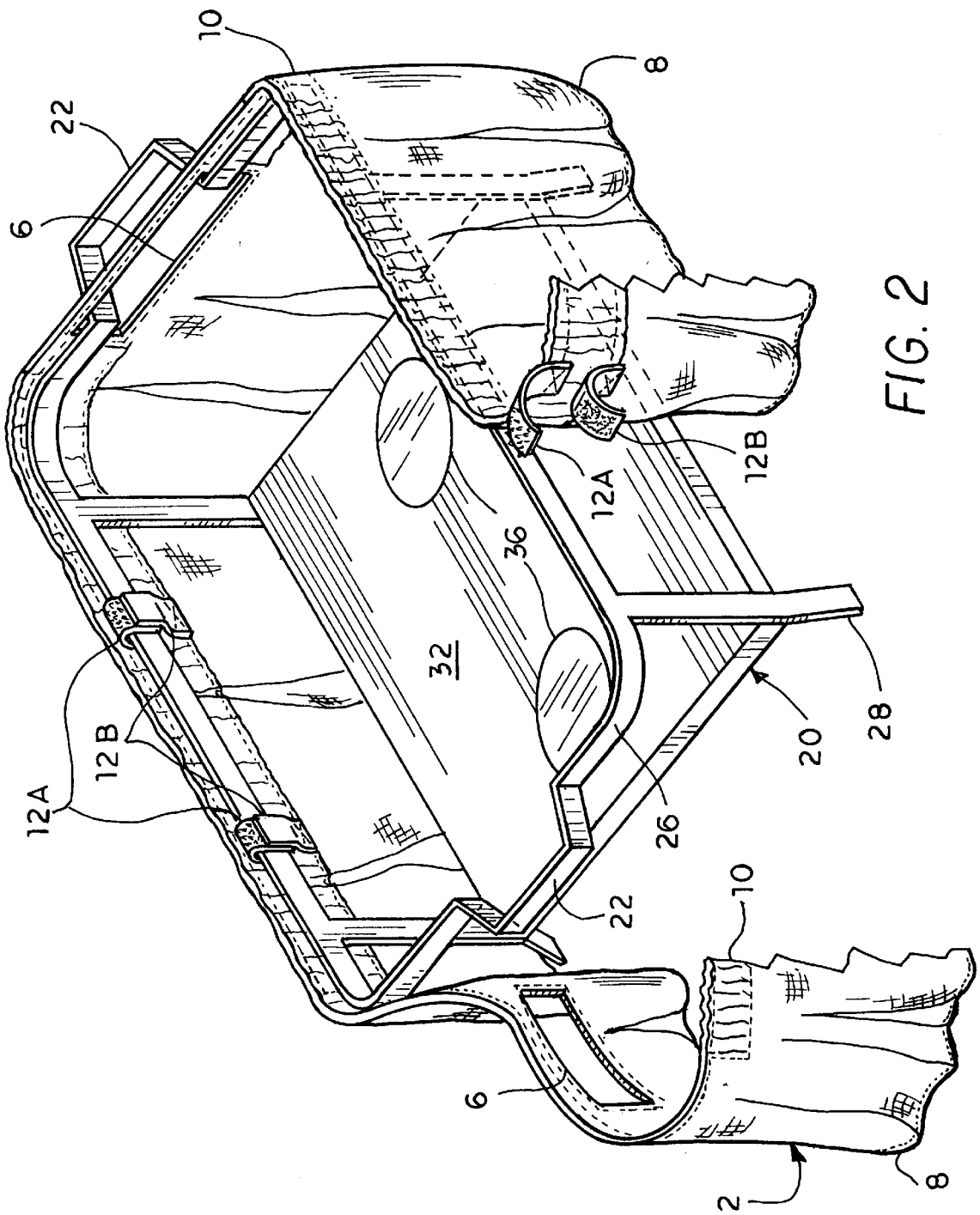
FIG. 2 is a perspective view of the chafing dish frame and skirt combination of FIG. 1 with a segment of the skirt cutaway to expose a section of the chafing dish frame.

Embodiments of the various aspects of the present invention will now be explained with reference to the accompanying drawings. By way of illustration and not limitation, FIGS. 1 and 2 are presented to show the preferred embodiment of the applicant's invention. FIG. 1 shows a chafing dish skirt 2 attached to the upper section 26 of a chafing dish frame 20. A chafing dish 50 is shown suspended above the chafing dish frame 20. The legs 52 of the chafing dish 50 will rest on the lower frame 32 (shown in FIG. 2) of the chafing dish frame 20. The burners 30 are placed underneath the chafing dish 50 to heat the contents of the chafing dish 50.

In the preferred embodiment, the chafing dish skirt 2 is detachably attached to the upper section 26 of a chafing dish frame 20 to shield the burners 30 from wind and to help retain heat within the chafing dish 50 to save energy.

To make the chafing dish skirt 2, a fire retardant fabric is sized and configured to detachably attach to the upper section 26 of the chafing dish frame 20. The skirt 2 has elastic band sections 10 that wrap around the upper section 26 of the chafing dish frame 20. The skirt 2 extends downward from the elastic band sections 10 to form a vertical wall that encloses the chafing dish frame 20 and help keep wind from blowing out the open flames of the burners 30 and help insulate the chafing dish 50. The skirt 2 is detachably secured to the chafing dish frame 20 by various structures, such as adhesive strips, hooks and loop (e.g., VELCRO) fasteners, snaps, clips and the like. Preferably, upper loop 12A and lower loop 12B fasteners (e.g., VELCRO) are attached to the skirt 2 such that the upper loop 12A and the lower loop 12B are detachably locked together to securely grasp the upper section 26 of the chafing dish frame 20, thereby fastening the skirt 2 around the frame 20 to effectively shield the burners 30 from the wind and help reflect heat back to the chafing dish 50.

Preferably, the fabric for the chafing dish skirt 2 is a cotton and polyester blend. Specifically, a 20% cotton and 80% polyester blend of fabric is used to make the skirt 2. Such a fabric, under the label "TRIGGER"™ was used to make the skirt 2. Such a fabric was proven to be durable for this purpose. However, it is believed that other fabrics that are substantially cotton or substantially polyester may also be suitable materials for the skirt 2. The skirt 2 may be pleated vertically to permit some expansion to more easily fit around the chafing dish frame 20.

To make the skirt 2 fire-retardant, to withstand the heat of the burners 30, a fire-retardant chemical such as "FLAME-KOTE"™ is applied to the skirt 2. Preferably, the fire-retardant is sprayed onto the skirt 2; the fabric that is used to make the skirt 2, however, may be treated with the fire-retardant chemical prior to the manufacture (cutting and stitching of the fabric) of the skirt 2. It is preferred that the skirt 2 is dry cleaned by standard dry-cleaning methods, after the skirt 2 becomes soiled or stained, although the skirt 2 may be hand washed or machine washed. It is preferred that the skirt 2 is re-sprayed with a fire-retardant chemical after going through five dry-cleaning cycles. Similarly, the skirt fire-retardant chemical should be reapplied after several hand or machine washings.

The chafing dish skirt 2 includes a plurality of elastic bands 10 at the upper section of the skirt to frictionally fit the skirt 2 around the upper section 26 of the chafing dish frame 20. Preferably, the chafing dish skirt 2 has openings that enable the handles 22 of the chafing dish frame 20 to extend out of the skirt 2 to further secure the skirt 2 around the chafing dish frame 20.

The chafing dish skirt 2 includes weighted lower sections 8 to help counter the effects of wind on the burners 30 of the chafing dish 50.

It is to be understood that the present invention is not limited to the embodiments described above, but encompasses any and all embodiments within the scope of the following claims.

I claim:

1. A chafing dish skirt for detachably attaching to a chafing dish frame having an upper section, a lower section and handle portions, to shield a heat source from wind and to help retain heat within the chafing dish, comprising:

a fire-retardant fabric sized and configured to detachably attach to the frame of the chafing dish frame, said fabric having an elastic band section that wraps around the upper section of the chafing dish, said fabric extending downward from the elastic band section to form a wall that vertically and substantially encloses the chafing dish frame; and attaching means for detachably fastening the skirt to the frame of the chafing dish frame.

2. The chafing dish skirt as recited in claim 1 wherein said fabric is a cotton and a polyester blend.

3. The chafing dish skirt as recited in claim 2 wherein said fabric is between 70 to 90% polyester.

4. The chafing dish skirt as recited in claim 1, wherein said fabric is substantially cotton.

5. The chafing dish skirt as recited in claim 1, wherein said fabric is substantially polyester.

6. The chafing dish skirt as recited in claim 1, wherein said fabric includes at least one elastic band at the upper section of said fabric to frictionally fit said fabric around the upper section of said chafing dish frame.

7. The chafing dish skirt as recited in claim 6, wherein said fabric includes openings that enable the handles of said chafing dish frame to extend out of said fabric through the openings to further enhance the fit of said fabric around said chafing dish frame.

8. The dish skirt as recited in claim 1, wherein said attaching means for detachably fastening the skirt to the upper section of the chafing dish frame includes loop fasteners attached to said fabric, said loop fasteners secured around sections of said chafing dish frame and adhering to one another to secure said fabric to said chafing dish frame.

9. The dish skirt as recited in claim 1, wherein said fabric is weighted to help counter the effects of wind thereby shielding said heat source of the chafing dish and reduce heat loss to the outside environment.

10. The dish skirt as recited in claim 1, wherein said fabric includes a plurality of pleats to more easily secure said skirt around said chafer dish frame.

11. The dish skirt as recited in claim 10, wherein said plurality of pleats extend vertically from near the elastic portions to the weighted lower sections of the chafing dish skirt.

\* \* \* \* \*